J. L. BECKER.
Evaporating-Pan.

No. 213,379.　　　　　Patented Mar. 18, 1879.

UNITED STATES PATENT OFFICE.

JOHN L. BECKER, OF CINCINNATI, OHIO.

IMPROVEMENT IN EVAPORATING-PANS.

Specification forming part of Letters Patent No. 213,379, dated March 18, 1879; application filed September 28, 1878.

*To all whom it may concern:*

Figure 1:
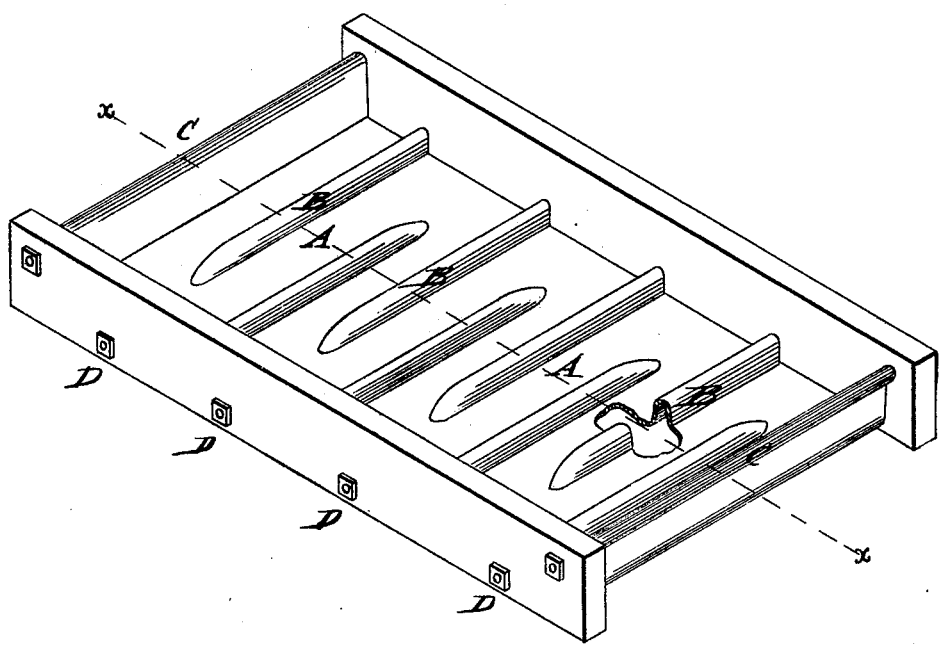
Figure 2:
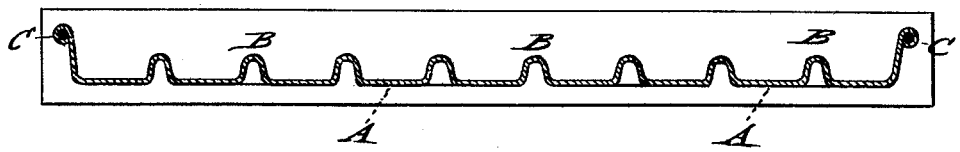

Be it known that I, JOHN L. BECKER, of Cincinnati, in the county of Hamilton and State of Ohio, have invented a new and Improved Evaporating-Pan, of which the following is a specification:

In the accompanying drawings, Figure 1 represents a perspective view of my improved evaporating-pan, shown partly in section; and Fig. 2 is a vertical longitudinal section of the same on line $x\,x$, Fig. 1.

Similar letters of reference indicate corresponding parts.

The invention consists in an evaporating-pan having a corrugated bottom stamped from a single piece of sheet metal, the corrugations of which extend alternately from opposite sides of the pan nearly to the opposite side, and then, sloping down, run out gradually to a level with the bottom, as hereinafter described.

Referring to the drawings, A represents the bottom of my evaporating-pan, which is pressed with alternating corrugations B out of one solid piece of metal, so that the bottom of the pan will be solid, without any cutting or soldering. The bottom is applied by transverse end rods C and short intermediate straps D, riveted to the under side of the bottom to the wooden or other side walls of the pan. The juice flows in a zigzag motion around the alternating corrugations, passing from one channel into the other, without any possibility of injury or leakage at the connection of the corrugations with the bottom.

The corrugations, being stamped up from the solid bottom, are not liable to get injured by the heat of the fire below, and are superior to the soldered corrugations in the old style of pans. The pan may also be manufactured cheaper, as the bottom may be stamped up with the corrugations in a press, and as the draw-rods are put on without any cutting to be done.

I am aware that evaporating-pans have been provided with bottoms doubled up at intervals to form high or low cross-bars, and then either cut and bent down at alternate ends at a short distance from one of the sides or flattened down at each end; but

What I claim is—

An evaporating-pan having a corrugated bottom stamped from a single piece of sheet metal, the corrugations of which extend alternately from opposite sides of the pan nearly to the opposite side, and then, sloping down, run out gradually to a level with the bottom, as shown and described.

JOHN LEANDER BECKER.

Witnesses:
A. W. ANDERSON,
EDWARD PHELAN.